US012272282B2

(12) United States Patent
Lin et al.

(10) Patent No.: US 12,272,282 B2
(45) Date of Patent: Apr. 8, 2025

(54) DISPLAY PANEL AND DRIVING METHOD THEREFOR, AND DISPLAY DEVICE

(71) Applicant: KUNSHAN GO-VISIONOX OPTO-ELECTRONICS CO., LTD, Jiangsu (CN)

(72) Inventors: Zhaomin Lin, Kunshan (CN); Zheng Wang, Kunshan (CN); Tao Tang, Jiangsu (CN)

(73) Assignee: KUNSHAN GO-VISIONOX OPTO-ELECTRONICS CO., LTD, Kunshan (CN)

( * ) Notice: Subject to any disclaimer, the term of this patent is extended or adjusted under 35 U.S.C. 154(b) by 0 days.

(21) Appl. No.: 18/400,431

(22) Filed: Dec. 29, 2023

(65) Prior Publication Data

US 2024/0135850 A1 Apr. 25, 2024
US 2024/0233594 A9 Jul. 11, 2024

Related U.S. Application Data

(63) Continuation of application No. PCT/CN2023/080777, filed on Mar. 10, 2023.

(30) Foreign Application Priority Data

May 17, 2022 (CN) ......................... 202210539301.6

(51) Int. Cl.
*G09G 3/20* (2006.01)

(52) U.S. Cl.
CPC ....... *G09G 3/20* (2013.01); *G09G 2300/0439* (2013.01); *G09G 2310/0213* (2013.01);
(Continued)

(58) Field of Classification Search
CPC .......... G09G 3/20; G09G 3/32; G09G 3/3225; G09G 3/3266; G09G 3/3648;
(Continued)

(56) References Cited

U.S. PATENT DOCUMENTS

2018/0301106 A1* 10/2018 Huang ................. G09G 3/3677
2021/0335215 A1* 10/2021 Liu ...................... G09G 3/3266
2024/0212643 A1* 6/2024 Liao ..................... G09G 3/3266

FOREIGN PATENT DOCUMENTS

CN 100447847 C 12/2008
CN 101329484 A 12/2008
(Continued)

OTHER PUBLICATIONS

International Search Report issued Apr. 29, 2023, in corresponding International Application No. PCT/CN2023/080777, 6 pages.
(Continued)

*Primary Examiner* — Nelson M Rosario
(74) *Attorney, Agent, or Firm* — Maier & Maier, PLLC

(57) ABSTRACT

A display panel, a driving method therefor, and a display device. The display panel includes a scan drive module and multiple rows of sub-pixel units arranged in sequence. The multiple rows of sub-pixel units are divided into n sub-pixel unit groups, and two adjacent rows of the sub-pixel units in each sub-pixel unit group are spaced by (n−1) rows of the sub-pixel units in other sub-pixel unit groups. The scan drive module is configured to sequentially scan and drive each row of the sub-pixel units in each sub-pixel unit group and scan and drive the n sub-pixel unit groups in divided periods within a scan cycle.

20 Claims, 7 Drawing Sheets

(52) U.S. Cl.
CPC ............... *G09G 2320/0247* (2013.01); *G09G 2340/0435* (2013.01)

(58) Field of Classification Search
CPC ......... G09G 3/3677; G09G 2300/0439; G09G 2310/0202; G09G 2310/0213; G09G 2310/0224; G09G 2320/0247; G09G 2340/0435; G09G 3/3208; G09G 2300/0426; G09G 2310/0218; G09G 2310/0286; G09G 3/3233; G09G 3/342; G09G 3/36; G09G 2310/0237; G09G 2310/024; G09G 2310/08; G09G 2320/0257; G09G 2320/064
See application file for complete search history.

(56) References Cited

FOREIGN PATENT DOCUMENTS

| | | | |
|---|---|---|---|
| CN | 103187018 | A | 7/2013 |
| CN | 104751757 | A | 7/2015 |
| CN | 103474039 | B | 9/2016 |
| CN | 106774781 | A | 5/2017 |
| CN | 106896594 | A | 6/2017 |
| CN | 108399883 | A | 8/2018 |
| CN | 108399895 | A | 8/2018 |
| CN | 108806592 | A | 11/2018 |
| CN | 109064965 | A | 12/2018 |
| CN | 110853595 | A | 2/2020 |
| CN | 112164373 | A | 1/2021 |
| CN | 114863871 | A | 8/2022 |
| CN | 115331607 | A | 11/2022 |
| JP | H01305676 | A | 12/1989 |
| JP | H095709 | A | 1/1997 |
| JP | 2003255909 | A | 9/2003 |
| JP | 2009194657 | A | 8/2009 |
| KR | 1020150055653 | A | 5/2015 |
| TW | 291554 | B | 11/1996 |

OTHER PUBLICATIONS

Office Action issued on Apr. 27, 2023, in corresponding Chinese Application No. 202210539301.6, 28 pages.
Office Action issued on Oct. 13, 2023, in corresponding Chinese Application No. 202210539301.6, 35 pages.
Office Action issued on Jul. 21, 2024, in corresponding Korean Application No. 10-2023-7044128, 14 pages.

* cited by examiner

DISPLAY PANEL AND DRIVING METHOD THEREFOR, AND DISPLAY DEVICE

CROSS-REFERENCE TO RELATED APPLICATIONS

This application is a continuation of International Patent Application No. PCT/CN2023/080777, filed on Mar. 10, 2023, which claims priority to Chinese Patent Application No. 202210539301.6 filed on May 17, 2022, disclosures of both of which are incorporated herein by reference in their entireties.

TECHNICAL FIELD

Embodiments of the present application relate to the field of display technologies and, in particular, to a display panel, a driving method therefor, and a display device.

BACKGROUND

With the continuous development of display technologies, people have increasingly higher requirements for the performance of a display panel. Currently, the display panel has a flicker problem. Especially when the refresh rate is relatively low, the flicker phenomenon of the display panel intensifies, further affecting the display effect.

SUMMARY

Embodiments of the present application provide a display panel, a driving method therefor, and a display device to alleviate the flicker phenomenon.

In a first aspect, an embodiment of the present application provides a display panel. The display panel includes multiple rows of sub-pixel units arranged in sequence and a scan drive module.

The multiple rows of sub-pixel units are divided into n sub-pixel unit groups, and two adjacent rows of the sub-pixel units in each sub-pixel unit group of the n sub-pixel unit groups are spaced by (n−1) rows of the sub-pixel units in other sub-pixel unit groups of the n sub-pixel unit groups, where n is a positive integer greater than or equal to 2.

The scan drive module is connected to each row of the sub-pixel units in each sub-pixel unit group in sequence and connected to each sub-pixel unit group in sequence.

The scan drive module is configured to sequentially scan and drive each row of the sub-pixel units in each sub-pixel unit group and scan and drive the n sub-pixel unit groups in divided periods within a scan cycle.

In a second aspect, an embodiment of the present application further provides a driving method of a display panel. The display panel includes a scan drive module and multiple rows of sub-pixel units arranged in sequence, where the multiple rows of sub-pixel units are divided into n sub-pixel unit groups, and two adjacent rows of the sub-pixel units in each sub-pixel unit group of the n sub-pixel unit groups are spaced by (n−1) rows of the sub-pixel units in other sub-pixel unit groups of the n sub-pixel unit groups, where n is a positive integer greater than or equal to 2; and the scan drive module is connected to each row of the sub-pixel units in each sub-pixel unit group in sequence and connected to each sub-pixel unit group in sequence.

The driving method of a display panel includes a step below.

The scan drive module sequentially scans and drives each row of the sub-pixel units in each sub-pixel unit group and scans and drives the n sub-pixel unit groups in divided periods within a scan cycle.

In a third aspect, an embodiment of the present application further provides a display device including the display panel described in the first aspect.

In the display panel, the driving method therefor, and the display device provided in the embodiments of the present application, two adjacent rows of the sub-pixel units in each sub-pixel unit group are spaced by (n−1) rows of the sub-pixel units, the scan drive module sequentially scans and drives each row of the sub-pixel units in each sub-pixel unit group and scans and drives the sub-pixel unit groups in divided periods within a scan cycle. In this manner, multiple times of interlaced scan drive for each row of the sub-pixel units in a scan cycle are achieved, the scan drive time difference of adjacent rows of the sub-pixel units is extended, and the phase difference between the brightness change curves of adjacent rows of the sub-pixel units is increased so that the brightness at any position in the display region is a brightness coupling value of adjacent rows of the sub-pixel units, which is conducive to enabling an equivalent refresh rate of the coupled display screen to be higher than an actual refresh rate, thereby reducing the brightness change amplitude after coupling at each position in the display region and alleviating the flicker phenomenon. In addition, in this embodiment, the transistors or storage capacitors in the pixel circuit do not need to be changed to alleviate the flicker phenomenon, the process difficulty and production cost of the display panel are not increased, and this embodiment is easier to implement than the related art.

DETAILED DESCRIPTION

As described in the BACKGROUND, the display panel has a flicker problem. Especially when the refresh rate is relatively low, the flicker phenomenon of the display panel intensifies, further affecting the display effect. Through research, an inventor finds that the reason for the preceding problem is specifically described in the aspects below.

Figure 1:
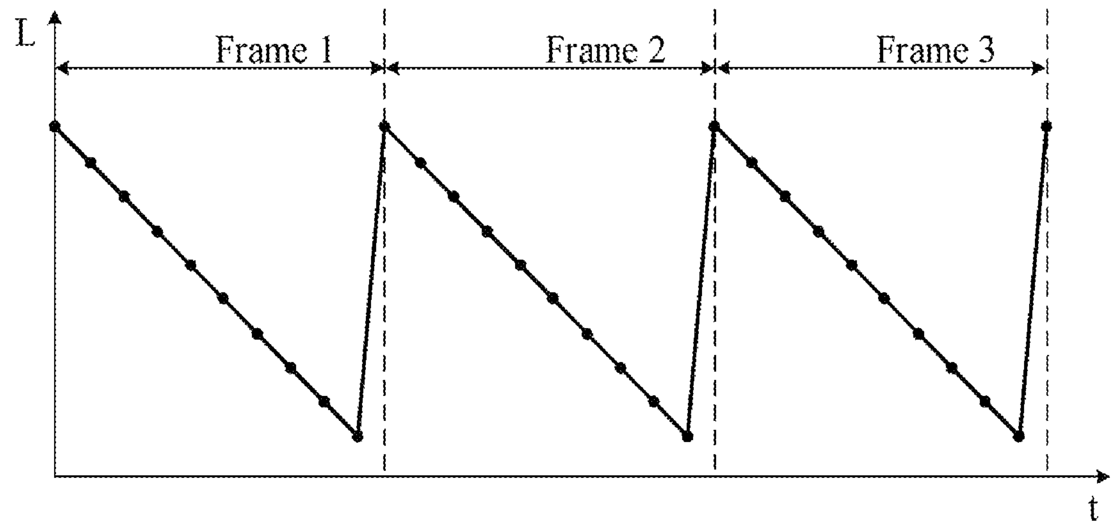
FIG. 1 is a schematic diagram of brightness changes at any position in a display region of an existing display panel.

The display panel includes pixel circuits for driving light-emitting devices for light-emitting display. Currently, transistors in the pixel circuit are mostly low-temperature poly-silicon (LTPS) transistors. The LTPS transistors commonly have the leakage current due to their characteristics. FIG. 1 is a schematic diagram of brightness changes at any position in a display region of an existing display panel and only schematically shows the brightness changes of a Frame 1 display screen to a Frame 3 display screen. In FIG. 1, L denotes brightness and t denotes time. For example, referring to FIG. 1, during a light emission stage within a frame, if a switch transistor connected to a gate of a drive transistor in the pixel circuit generates a leakage current, resulting in the following: the gate potential of the drive transistor is unstable, the brightness of the light-emitting device gradually decreases within a frame, the brightness at any position in the display region gradually decreases within a frame, and the brightness at any position in the display region shows periodic changes with a frame rate as shown in FIG. 1. In the existing row-by-row scan drive manner, the brightness at different positions in the display region is inconsistent, so the screen may flicker. Especially in the case of low-frequency driving, since it is difficult for a storage capacitor to maintain the gate potential of the drive transistor for a long time, the gate potential of the drive transistor is more unstable, making the brightness change amplitude at any position in the display region within a frame larger. Further, at the refresh rate of 24 Hz, the ability of the human eyes to recognize the flicker is greatly improved, resulting in an intensified flicker phenomenon of the display panel at low frequencies.

In the related art, usually, the storage capacity of the storage capacitor is improved, or low temperature polycrystalline oxide (LTPO) is used to improve the leakage current phenomenon of the transistor, thereby improving the stability of the gate potential of the drive transistor to alleviate the flicker phenomenon. However, in the preceding methods, either the problem of a limited flicker alleviation effect exists, or the problem of high cost and relatively high process difficulty exists, and the preceding methods are not easy to implement.

Figure 2:
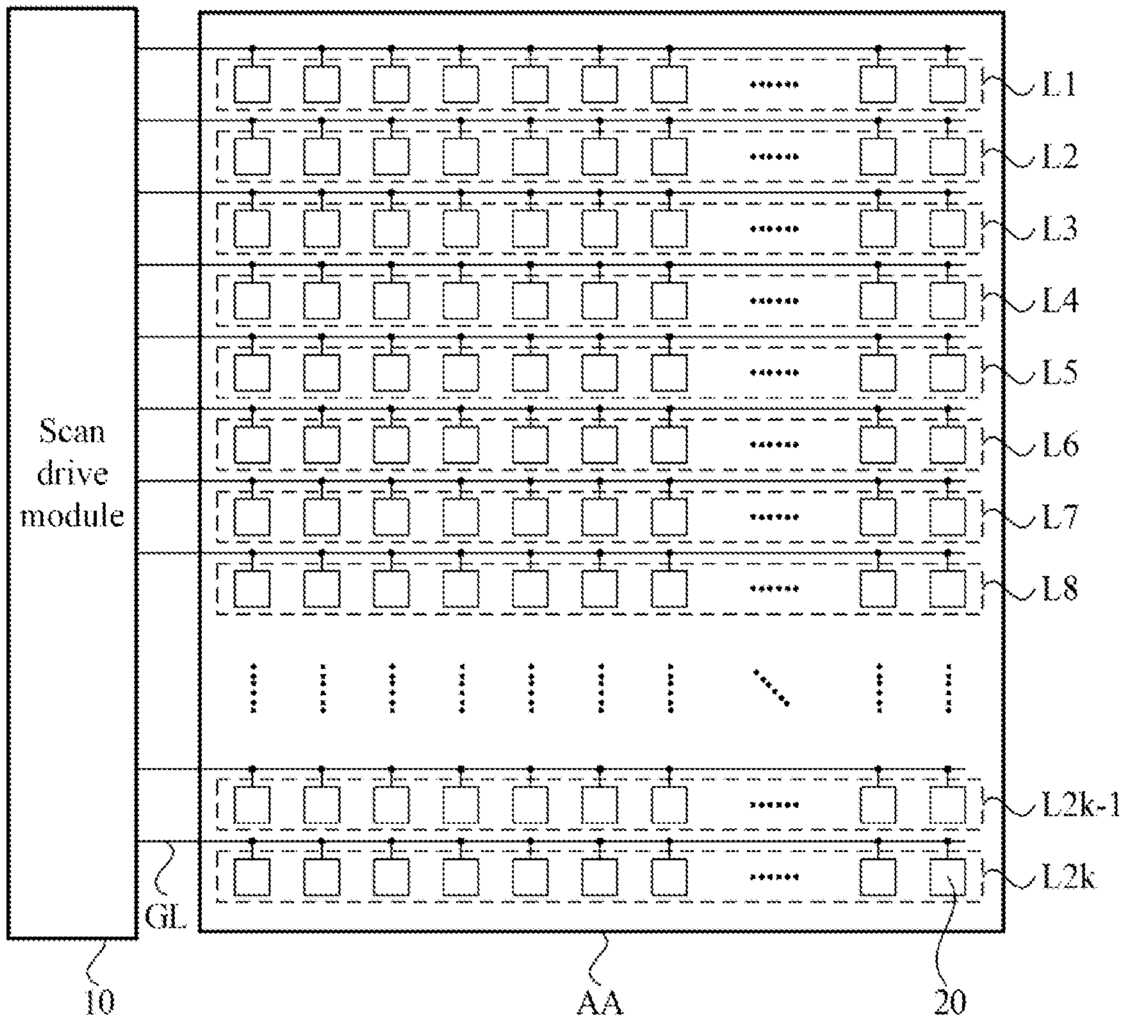
FIG. 2 is a structural diagram of a display panel according to an embodiment of the present application.

In view of the preceding problems, an embodiment of the present application provides a display panel. FIG. 2 is a structural diagram of a display panel according to an embodiment of the present application. Referring to FIG. 2, the display panel includes a scan drive module 10 and multiple rows of sub-pixel units 20 arranged in sequence. The multiple rows of sub-pixel units 20 are divided into n sub-pixel unit groups, and two adjacent rows of the sub-pixel units 20 in each sub-pixel unit group are spaced by (n−1) rows of the sub-pixel units 20 in other sub-pixel unit groups, where n≥2, and n is a positive integer. The scan drive module 10 is connected to each row of the sub-pixel units 20 in each sub-pixel unit group in sequence and connected to each sub-pixel unit group in sequence. The scan drive module 10 is configured to sequentially scan and drive each row of the sub-pixel units 20 in each sub-pixel unit group and scan and drive the n sub-pixel unit groups in divided periods within a scan cycle.

Specifically, the display panel in the embodiment of the present application may be a light emitting diode (LED) display panel, a micro light emitting diode (micro LED) display panel, an organic light emitting diode (OLED) display panel, an active-matrix organic light emitting diode (AMOLED) display panel, a liquid crystal display panel, or the like.

The sub-pixel unit 20 includes a pixel circuit and a light-emitting device, and the pixel circuit is connected to the corresponding light-emitting device. The scan drive module 10 may be connected to the pixel circuits in each row of the sub-pixel units 20 through a scan line GL, so as to transmit scan signals to the pixel circuits in each row of the sub-pixel units 20 through the scan line GL. Controlled by the scan signal, the pixel circuit may drive the light-emitting device for light-emitting display with corresponding brightness according to a received data voltage, thereby scanning and driving each row of the sub-pixel units 20 by the scan drive module 10.

Each row of the sub-pixel units 20 in the display panel may be divided into n sub-pixel unit groups, and each sub-pixel unit group may include multiple rows of the sub-pixel units 20. For example, in the case where n=2, rows of the sub-pixel units 20 may be divided into two sub-pixel unit groups, and two adjacent rows of the sub-pixel units 20 in each sub-pixel unit group are spaced by one row of the sub-pixel units 20 in another sub-pixel unit group. In the case where n=3, rows of the sub-pixel units 20 may be divided into three sub-pixel unit groups, and two adjacent rows of the sub-pixel units 20 in each sub-pixel unit group are spaced by two rows of the sub-pixel units 20 in other sub-pixel unit groups. In the case where n=4, rows of the sub-pixel units 20 may be divided into four sub-pixel unit groups, and two adjacent rows of the sub-pixel units 20 in each sub-pixel unit group are spaced by three rows of the sub-pixel units 20 in other sub-pixel unit groups, and so on. n may be a value greater than or equal to 2, and the maximum value of n may be set according to the total number of rows of the sub-pixel units 20.

The scan drive module 10 sequentially scans and drives each row of the sub-pixel units 20 in each sub-pixel unit group, which means that the scan drive module 10 can sequentially output the scan signals to each row of the sub-pixel units 20 in the sub-pixel unit group to drive the light-emitting devices in each row of the sub-pixel units 20 for light-emitting display. The scan drive module 10 scans and drives the sub-pixel unit groups in divided periods within a scan cycle, which means that the scan cycle is divided into n periods, the scan drive module 10 separately scans and drives each sub-pixel unit group in n periods and sequentially scans and drives each row of the sub-pixel units 20 in the corresponding sub-pixel unit group in each period.

Optionally, the scan drive module 10 is configured to sequentially scan and drive each row of the sub-pixel units in a first sub-pixel unit group in a first period within the scan cycle, sequentially scan and drive each row of the sub-pixel units in a second sub-pixel unit group in a second period within one scan cycle, and so on, until rows of the sub-pixel units in an n-th sub-pixel unit group are sequentially scanned and driven in an n-th period at the last of the scan cycle, so as to complete the scanning and driving in one scan cycle. After the scanning and driving in one scan cycle, the scanning and driving in the next scan cycle may be performed. For example, one scan cycle may include one frame, and one frame may be divided into n periods. The scan drive module 10 may sequentially scan and drive each row of the sub-pixel units 20 in the first sub-pixel unit group in the first period and sequentially scan and drive each row of the sub-pixel units 20 in the second sub-pixel unit group in the second period. By analogy, each row of the sub-pixel units 20 in the n-th sub-pixel unit group is sequentially scanned and driven in the n-th period.

The case where the display panel includes 2k rows of the sub-pixel units 20 and n=2 is used as an example for the description below. Optionally, the multiple rows of the sub-pixel units 20 are divided into the first sub-pixel unit group and the second sub-pixel unit group. The first sub-pixel unit group includes odd-numbered rows of the sub-pixel units 20, and the second sub-pixel unit group includes even-numbered rows of the sub-pixel units 20. The scan drive module 10 is configured to sequentially scan and drive each row of the sub-pixel unis 20 in the first sub-pixel unit group in the first period within the scan cycle and sequentially scans and drives each row of the sub-pixel units 20 in the second sub-pixel unit group in the second period within the scan cycle.

For example, the first sub-pixel unit group includes the first row of the sub-pixel units L1, the third row of the sub-pixel units L3, the fifth row of the sub-pixel units L5, the seventh row of the sub-pixel units L7, . . . , and the (2k−1)-th row of the sub-pixel units L2k−1, and the second sub-pixel unit group includes the second row of the sub-pixel units L2, the fourth row of the sub-pixel units L4, the sixth row of the sub-pixel units L6, the eighth row of the sub-pixel units L8, . . . , and the 2k-th row of the sub-pixel units L2k.

Figure 3:
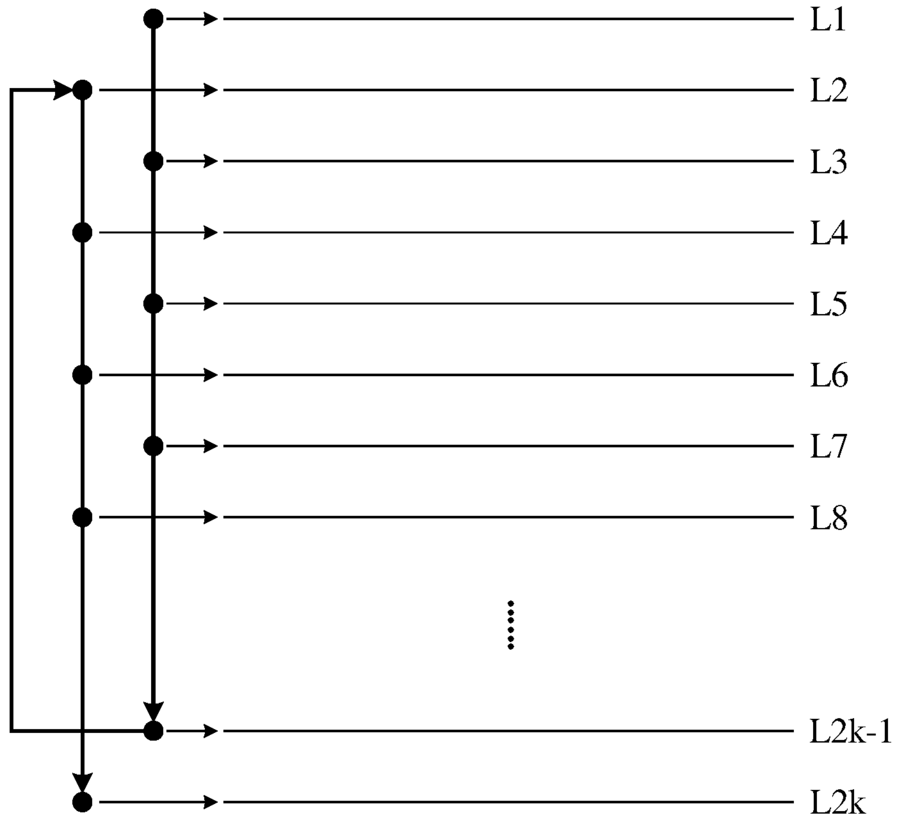
FIG. 3 is a schematic diagram of a scan drive sequence according to an embodiment of the present application.

FIG. 3 is a schematic diagram of a scan drive sequence according to an embodiment of the present application. FIG. 3 schematically shows the first row of the sub-pixel units L1 to the 2k-th row of the sub-pixel units L2k in FIG. 2 by multiple parallel lines and shows the scan drive sequence of each row of the sub-pixel units by arrows. In conjunction with FIGS. 2 and 3, in the case where n=2, one frame may be divided into the first period and the second period. In the first period, the scan drive module 10 sequentially outputs the scan signals to the first row of the sub-pixel units L1, the third row of the sub-pixel units L3, the fifth row of the sub-pixel units L5, the seventh row of the sub-pixel units L7, . . . , and the (2k−1)-th row of the sub-pixel units L2k−1 to drive the light-emitting devices in the odd-numbered rows of the sub-pixel units 20 for light-emitting display. In the second period, the scan drive module 10 sequentially outputs the scan signals to the second row of the sub-pixel units L2, the fourth row of the sub-pixel units L4, the sixth row of the sub-pixel units L6, the eighth row of the sub-pixel units L8, . . . , and the 2k-th row of the sub-pixel units L2k to drive the light-emitting devices in the even-numbered rows of the sub-pixel units 20 for light-emitting display.

Figure 4:
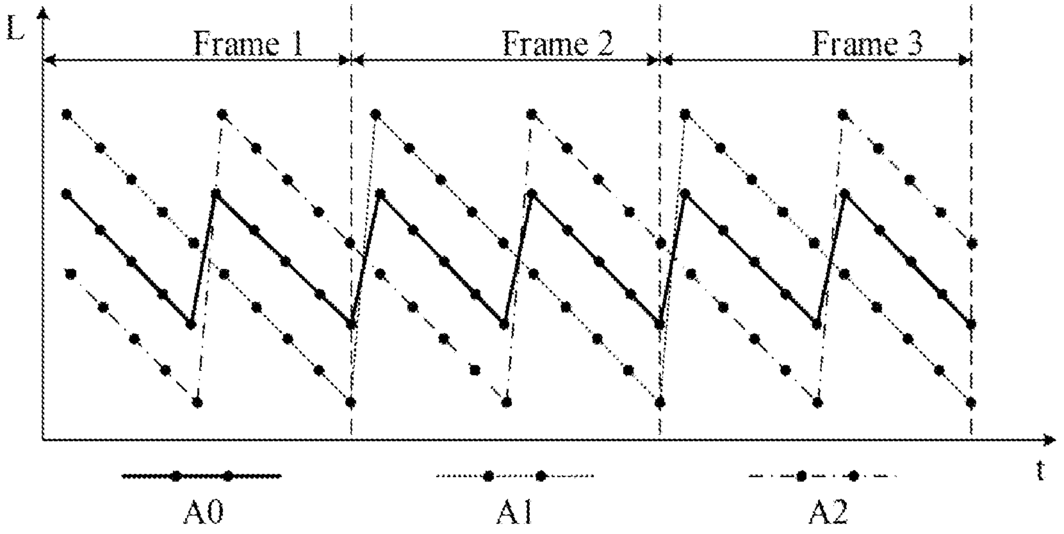
FIG. 4 is a schematic diagram of brightness change curves in a display region corresponding to the scan drive sequence shown in FIG. 3.

FIG. 4 is a schematic diagram of brightness change curves in a display region corresponding to the scan drive sequence shown in FIG. 3. FIG. 4 only schematically shows the brightness changes of the Frame 1 display screen to the Frame 3 display screen. A1 denotes the brightness change curve of the (2p−1)-th row of the sub-pixel units, A2 denotes the brightness change curve of the 2p-th row of the sub-pixel units, $1 \le p \le k$, and A0 denotes the coupled brightness change curve of the (2p−1)-th row of the sub-pixel units and the 2p-th row of the sub-pixel units. Referring to FIG. 4, due to the leakage current of the transistors in the pixel circuit and the insufficient ability of the storage capacitor to maintain the gate potential of the drive transistor under low-frequency driving, the brightness of the light-emitting devices in each row of the sub-pixel units changes periodically with the frame rate, and the duration of the brightness change cycle is approximately equal to the duration of one frame. Within one scan cycle, the brightness of the light-emitting devices in each row of the sub-pixel units gradually decreases. Since the scan drive module 10 sequentially scans and drives the odd-numbered rows of the sub-pixel units in the first period within one scan cycle and sequentially scans and drives the even-numbered rows of the sub-pixel units in the second period within one scan cycle. Therefore, the scan drive time of the even-numbered rows of the sub-pixel units is half a frame later than the scan drive time of the odd-numbered rows of the sub-pixel units, that is, half the brightness change cycle later. That is, the scan drive time of the 2p-th row of the sub-pixel units is haft the brightness change cycle later than the scan drive time of the (2p−1)-th row of the sub-pixel units, and the time when the brightness of the sub-pixel units in the (2p−1)-th row and the 2p-th row reaches the peak is spaced by half the brightness change cycle.

Since the number of rows of sub-pixel units in the display panel is very large, the brightness at any position in the display region is the brightness coupling value of the sub-pixel unit rows adjacent to the position so that the brightness of a region where the sub-pixel units in the (2p−1)-th row and the 2p-th row are located is the brightness coupling value of the sub-pixel units in the (2p−1)-th row and the 2p-th row. As can be seen from the coupled brightness change curve A0 of the (2p−1)-th row of the sub-pixel units and the 2p-th row of the sub-pixel units, the brightness change cycle of this region after coupling is the duration of half a frame, that is, half the brightness change cycle of the sub-pixel units in the (2p−1)-th row and the 2p-th row. Therefore, the display effect after the superposition and coupling of the brightness of the sub-pixel units in the (2p−1)-th row and the 2p-th row is equivalent to doubling the refresh rate. Compared with the brightness change amplitude of the sub-pixel units in the (2p−1)-th row and the 2p-th row, the brightness change amplitude of this region after coupling is reduced. Under the combined effect of the two factors such as the equivalent increased refresh rate and the reduced brightness change amplitude, the flicker degree in the region where the sub-pixel units in the (2p−1)-th row and the 2p-th row are coupled is alleviated, and the flicker recognition capability of the human eyes for this region is reduced. The brightness at any position in the display region may be regarded as the brightness coupling value of the odd-numbered rows and even-numbered rows of the sub-pixel units adjacent to the position. Therefore, this embodiment is conducive to alleviating the flicker phenomenon of the entire display panel.

In the embodiment of the present application, two adjacent rows of the sub-pixel units in each sub-pixel unit group are spaced by (n−1) rows of the sub-pixel units in other sub-pixel unit groups, the scan drive module sequentially scans and drives each row of the sub-pixel units in each sub-pixel unit group and scans and drives the sub-pixel unit groups in divided periods within a scan cycle. In this manner, multiple times of interlaced scan drive for each row of the sub-pixel units in one scan cycle are achieved, the scan drive time difference of adjacent rows of the sub-pixel units is extended, and the phase difference between the brightness change curves of adjacent rows of the sub-pixel units is increased so that the brightness at any position in the display region is a brightness coupling value of adjacent rows of the sub-pixel units, which is conducive to enabling an equivalent refresh rate of the coupled display screen to be higher than an actual refresh rate, thereby reducing the brightness change amplitude after coupling at each position in the display region and alleviating the flicker phenomenon. In addition, in this embodiment, the transistors or storage capacitors in the pixel circuit do not need to be changed to alleviate the flicker phenomenon, the process difficulty and production cost of the display panel are not increased, and this embodiment is easier to implement than the related art.

Referring to FIG. 2, optionally, the first row of the sub-pixel units in the display panel are sub-pixel units first to be scanned by the scan drive module 10 in all the sub-pixel unit groups within the scan cycle, and the first row of the sub-pixel units in each sub-pixel unit group are sub-pixel units first to be scanned by the scan drive module 10 in the sub-pixel unit group within the scan cycle; and the scan drive module 10 is configured to sequentially scan and drive the first sub-pixel unit group to the n-th sub-pixel unit group within the scan cycle, where the first row of the sub-pixel units in the first sub-pixel unit group to the n-th sub-pixel unit group are adjacent in sequence.

For example, in the case where n=2, the first row of the sub-pixel units in the first sub-pixel unit group are the first row of the sub-pixel units in the display panel, the first row of the sub-pixel units in the second sub-pixel unit group are the second row of the sub-pixel units in the display panel, the previous row of the sub-pixel units and the next row of the sub-pixel units in each sub-pixel unit group are spaced by one row of the sub-pixel units, and the sequence of the scan drive module 10 scanning and driving each row of the sub-pixel units within one scan cycle may be expressed as: L1, L3, L5, L7, . . . , L2k−1, L2, L4, L6, L8, . . . , and L2k so that the scan drive time difference of the sub-pixel units in the (2p−1)-th row and the 2p-th row is half a frame, that is, half the brightness change cycle, where 1≤p≤k. The brightness at any position in the display region may be the coupled brightness of the sub-pixel units in the (2p−1)-th row and the 2p-th row adjacent to this position.

Similarly, in the case where n=3 and the display panel includes 3k rows of the sub-pixel units (this case is not specifically shown in FIG. 2), the first row of the sub-pixel units in the first sub-pixel unit group are the first row of the sub-pixel units in the display panel, the first row of the sub-pixel units in the second sub-pixel unit group are the second row of the sub-pixel units in the display panel, the first row of the sub-pixel units in the third sub-pixel unit group are the third row of the sub-pixel units in the display panel, and the previous row of the sub-pixel units and the next row of the sub-pixel units in each sub-pixel unit group are spaced by two rows of the sub-pixel units. For ease of description, the case where Lk denotes the k-th row of the sub-pixel units is used as an example, and the sequence of the scan drive module 10 scanning and driving each row of the sub-pixel units within one scan cycle may be expressed as: L1, L4, L7, L3k−2, L2, L5, L8, . . . , L3k−1, L3, L6, L9, . . . , and L3k so that the scan drive time difference of the sub-pixel units in the (3p−2)-th row, the (3p−1)-th row, and the 3p-th row is one third of a frame in sequence, that is, one third of the brightness change cycle, where 1≤p≤k. The brightness at any position in the display region may be the coupled brightness of the sub-pixel units in the (3p−2)-th row, the (3p−1)-th row, and the 3p-th row adjacent to this position.

Figure 5:
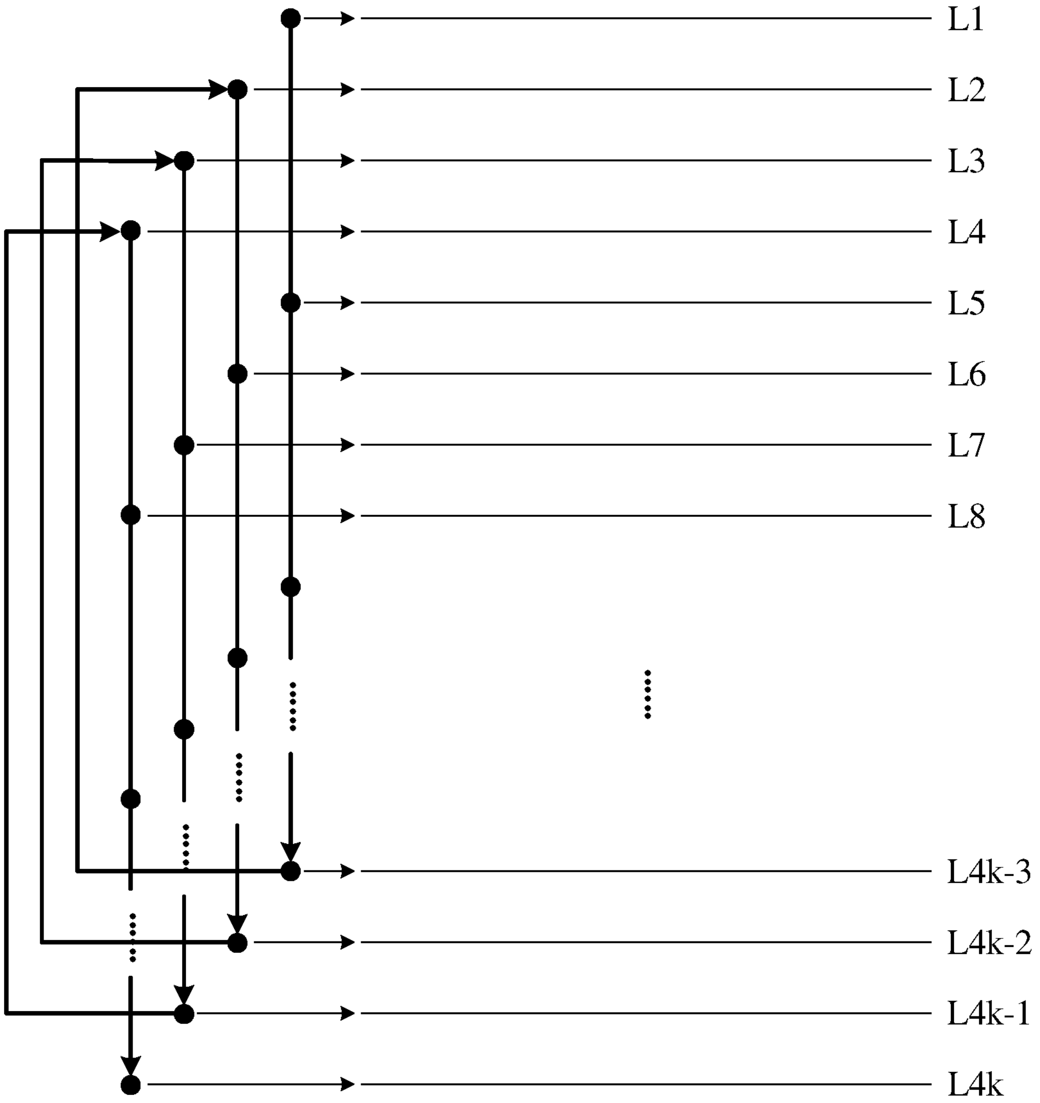
FIG. 5 is a schematic diagram of another scan drive sequence according to an embodiment of the present application.

FIG. 5 is a schematic diagram of another scan drive sequence according to an embodiment of the present application. In FIG. 5, the case where n=4 and the display panel includes 4k rows of the sub-pixel units 20 is used as an example. FIG. 5 schematically shows the first row of the sub-pixel units L1 to the 4k-th row of the sub-pixel units L4k by multiple parallel lines and shows the scan drive sequence of each row of the sub-pixel units by arrows. Referring to FIG. 5, in the case where n=4, the first row of the sub-pixel units in the first sub-pixel unit group are the first row of the sub-pixel units in the display panel, the first row of the sub-pixel units in the second sub-pixel unit group are the second row of the sub-pixel units in the display panel, the first row of the sub-pixel units in the third sub-pixel unit group are the third row of the sub-pixel units in the display panel, the first row of the sub-pixel units in the fourth sub-pixel unit group are the fourth row of the sub-pixel units in the display panel, and the previous row of the sub-pixel units and the next row of the sub-pixel units in each sub-pixel unit group are spaced by three rows of the sub-pixel units. The sequence of the scan drive module 10 scanning and driving each row of the sub-pixel units within one scan cycle may be expressed as: L1, L5, L4k−3, L2, L6, L4k−2, L3, L7, . . . , L4k−1, L4, L8, . . . , and L4k.

Figure 6:
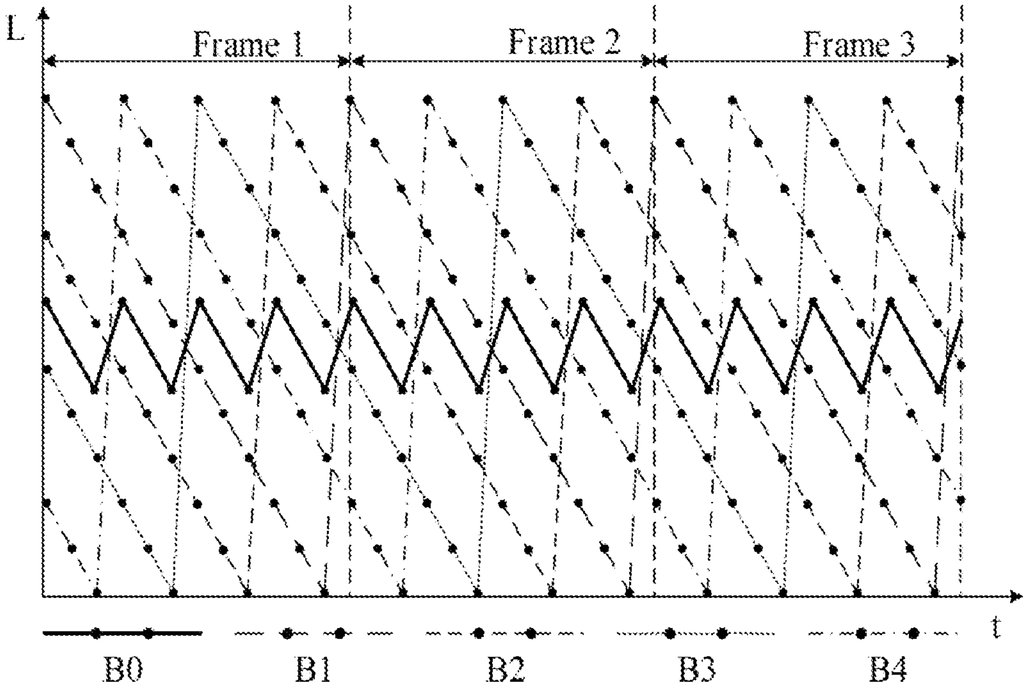
FIG. 6 is a schematic diagram of brightness change curves in a display region corresponding to the scan drive sequence shown in FIG. 5.

FIG. 6 is a schematic diagram of brightness change curves in a display region corresponding to the scan drive sequence shown in FIG. 5. FIG. 6 only schematically shows the brightness changes of the Frame 1 display screen to the Frame 3 display screen. B1 denotes the brightness change curve of the (4p−3)-th row of the sub-pixel units, B2 denotes the brightness change curve of the (4p−2)-th row of the sub-pixel units, B3 denotes the brightness change curve of the (4p−1)-th row of the sub-pixel units, B4 denotes the brightness change curve of the 4p-th row of the sub-pixel units, 1≤p≤k, B0 denotes the coupled brightness change curve of the sub-pixel units in the (4p−3)-th row, the (4p−2)-th row, the (4p−1)-th row, and the 4p-th row. Referring to FIG. 6, the scan drive time difference of the sub-pixel units in the (4p−3)-th row, the (4p−2)-th row, the (4p−1)-th row, and the 4p-th row is one fourth of a frame in sequence, that is, one fourth of the brightness change cycle. The brightness at any position in the display region may be the coupled brightness of the sub-pixel units in the (4p−3)-th row, the (4p−2)-th row, the (4p−1)-th row, and the 4p-th row adjacent to this position. As can be seen from the coupled brightness change curve B0 of the sub-pixel units in the (4p−3)-th row, the (4p−2)-th row, the (4p−1)-th row, and the 4p-th row, the brightness change cycle of this region after coupling is the duration of one fourth of a frame, that is, one fourth of the brightness change cycle of the sub-pixel units in the (4p−3)-th row, the (4p−2)-th row, the (4p−1)-th row, and the 4p-th row. Therefore, the display effect after the superposition and coupling of the brightness of the sub-pixel units in the (4p−3)-th row, the (4p−2)-th row, the (4p−1)-th row, and the 4p-th row is equivalent to increasing the refresh rate to four times the original. Compared with the brightness change amplitude of the sub-pixel units in the (4p−3)-th row, the (4p−2)-th row, the (4p−1)-th row, and the 4p-th row, the brightness change amplitude of this region after coupling is greatly reduced, which is conducive to alleviating the flicker degree of this region after coupling and reducing the flicker recognition capability of the human eyes for this region. The brightness at any position in the display region may be regarded as the brightness coupling value of adjacent four rows of the sub-pixel units. This embodiment is conducive to alleviating the flicker phenomenon of the entire display panel. The corresponding situation in the case where n is another value may be deduced in this manner and the details are not repeated.

In the embodiment of the present application, the scan drive time difference of adjacent rows of the sub-pixel units is a set difference according to the grouping of each row of the sub-pixel units so that the brightness at any position in the display region is the brightness coupling value of the multiple rows of the sub-pixel units adjacent to this position, which is conducive to enabling an equivalent refresh rate of the coupled display screen to be higher than an actual refresh rate, thereby reducing the brightness change amplitude after coupling at each position in the display region and alleviating the flicker phenomenon. Moreover, to a certain extent, the larger the value of n is, the more groups of the sub-pixel units there are, and the brightness at any position in the display region may be the brightness coupling value of more rows of adjacent sub-pixel units so that the equivalent refresh rate of the coupled display screen is higher, and the brightness change amplitude at each position in the display region after coupling is reduced to a smaller value. The maximum value of n may be set according to the actual pixel density of the display panel and the number of rows of sub-pixel units that can be distinguished by the human eyes.

Figure 7:
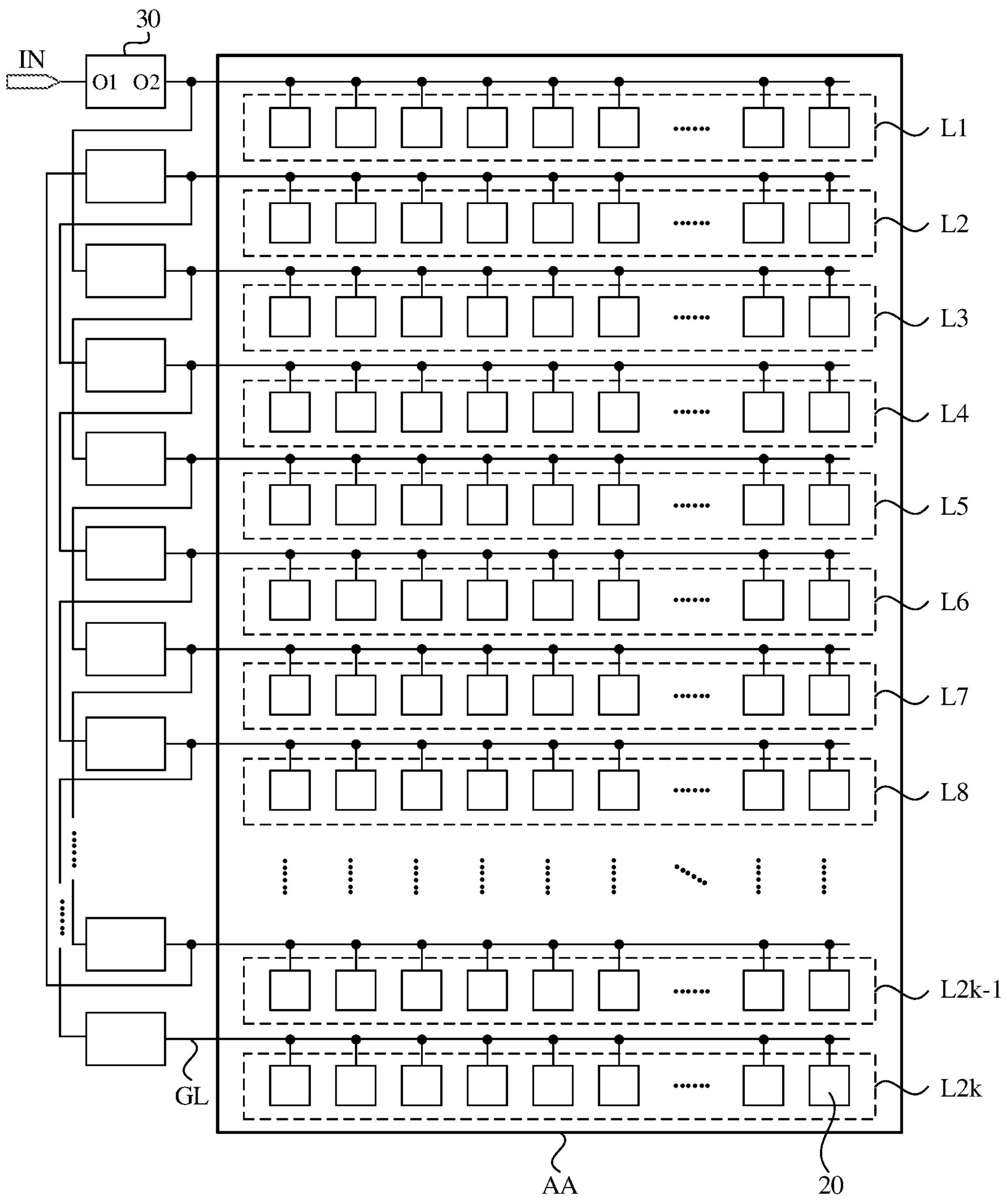
FIG. 7 is a structural diagram of another display panel according to an embodiment of the present application.

FIG. 7 is a structural diagram of another display panel according to an embodiment of the present application. Referring to FIG. 7, optionally, the scan drive module includes n scan circuit groups in one-to-one correspondence with the sub-pixel unit groups, each scan circuit group includes scan circuits 30 in one-to-one correspondence with each row of the sub-pixel units 20 in the sub-pixel unit group, the scan circuit 30 includes a start signal input terminal O1 and a scan signal output terminal O2, and the scan signal output terminal O2 of the scan circuit 30 is connected to one row of the sub-pixel units 20 corresponding to the scan circuit 30. Specifically, the start signal input terminal O1 of the scan circuit 30 is configured to be connected to a start signal, the scan signal output terminal O2 is configured to output the scan signal, the scan signal output terminal O2 of the scan circuit 30 is connected to the corresponding row of the sub-pixel units 20 through the scan line GL, and the scan circuit 30 is configured to perform a timing shift on the start signal connected to the start signal input terminal O1 of the scan circuit 30 to obtain the scan signal and then output the scan signal to the corresponding row of the sub-pixel units 20 through the scan signal output terminal O2 and the scan line GL.

With continued reference to FIG. 7, optionally, the scan circuits 30 in the scan circuit group corresponding to rows of the sub-pixel units 20 are connected in a cascade manner in sequence, the start signal input terminal O1 of the first-stage scan circuit 30 in the scan circuit group is connected to the start signal, the scan signal output terminal O2 of the (i−1)-stage scan circuit 30 is connected to the start signal input terminal O1 of the i-stage scan circuit 30, and the timing of the start signal connected to the first-stage scan circuit 30 in the j-th scan circuit group is later than the timing of the start signal connected to the first-stage scan circuit 30 in the (j−1)-th scan circuit group, where 2≤i≤m, m denotes the total number of stages of the scan circuits 30 in each scan circuit group, and 2≤j≤n.

Specifically, the scan signal outputted by the (i−1)-stage scan circuit 30 in each scan circuit group may be used as the start signal of the i-stage scan circuit 30, and each stage of scan circuit 30 can shift the timing of the scan signal outputted by the previous stage of scan circuit 30 so that each scan circuit group can sequentially output the scan signals to each row of the sub-pixel units 20 in the corresponding sub-pixel unit group, thereby sequentially scanning and driving each row of the sub-pixel units 20 in each sub-pixel unit group.

Optionally, the first-stage scan circuit 30 in the first scan circuit group is connected to a start signal IN, and the scan signal output terminal O2 of the last-stage scan circuit 30 in the (j−1)-th scan circuit group is connected to the start signal input terminal O1 of the first-stage scan circuit in the j-th scan circuit group. In this manner, the scan signal outputted by the last-stage scan circuit 30 in the (j−1)-th scan circuit group may be used as the start signal of the first-stage scan circuit 30 in the j-th scan circuit group so that the timing of the start signal connected to the first-stage scan circuit 30 in the j-th scan circuit group is later than the timing of the start signal connected to the first-stage scan circuit 30 in the (j−1)-th scan circuit group, so as to sequentially output the scan signal to the corresponding sub-pixel unit group by each scan circuit group, thereby scanning and driving the sub-pixel unit groups in divided periods within one scan cycle.

For example, the case where n=2 is used as an example for description. In the case where n=2, the scan drive module includes two scan circuit groups. The first scan circuit group includes the scan circuits 30 connected to the first row of the sub-pixel units L1, the third row of the sub-pixel units L3, the fifth row of the sub-pixel units L5, the seventh row of the sub-pixel units L7, . . . , and the (2k−1)-th row of the sub-pixel units L2k−1 in one-to-one correspondence, and the scan circuits corresponding to the sub-pixel units in the first row, the third row, the fifth row, the seventh row, . . . , and the (2k−1)-th row are connected in a cascade manner in sequence. The second scan circuit group includes the scan circuits 30 connected to the second row of the sub-pixel units L2, the fourth row of the sub-pixel units L4, the sixth row of the sub-pixel units L6, the eighth row of the sub-pixel units L8, . . . , and the 2k–th row of the sub-pixel units L2k in one-to-one correspondence, and the scan circuits 30 corresponding to the sub-pixel units in the second row, the fourth row, the sixth row, the eighth row, . . . , and the 2k–th row are connected in a cascade manner in sequence. The first-stage scan circuit 30 in the first scan circuit group is connected to the start signal IN, and the scan signal output terminal O2 of the last-stage scan circuit 30 in the first scan circuit group is connected to the start signal input terminal O1 of the first-stage scan circuit 30 in the second scan circuit group. In this manner, in the first period within one scan cycle, the scan circuits 30 in the first scan circuit group sequentially output the scan signals to the sub-pixel units in the first row, the third row, the fifth row, the seventh row, . . . , and the (2k−1)-th row, so as to drive the light-emitting devices in the odd-numbered rows of the sub-pixel units 20 for light-emitting display; and in the second period, the scan circuits 30 in the second scan circuit group sequentially output the scan signals to the sub-pixel units in the second row, the fourth row, the sixth row, the eighth row, . . . , and the 2k–th row, so as to drive the light-emitting devices in the even-numbered rows of the sub-pixel units 20 for light-emitting display.

With continued reference to FIG. 7, optionally, in the case where n=2, the first-stage scan circuit in the second scan circuit group is located between the first-stage scan circuit 30 and the second-stage scan circuit 30 in the first scan circuit group. For example, the scan circuits 30 in each scan circuit group are all located on a side of a non-display region of the display panel closing to a display region AA and are arranged in one column, the first-stage scan circuit 30 in the second scan circuit group is located between the first-stage scan circuit 30 and the second-stage scan circuit 30 in the first scan circuit group, the second-stage scan circuit 30 in the second scan circuit group is located between the second-stage scan circuit 30 and the third-stage scan circuit 30 in the first scan circuit group, and so on. The advantage of this arrangement is that the setting region of each scan circuit 30 corresponds to the position of the corresponding row of the sub-pixel units so that the scan circuit 30 is connected to the corresponding row of the sub-pixel units 20 and outputs the scan signal to the corresponding row of the sub-pixel units 20.

Figure 8:
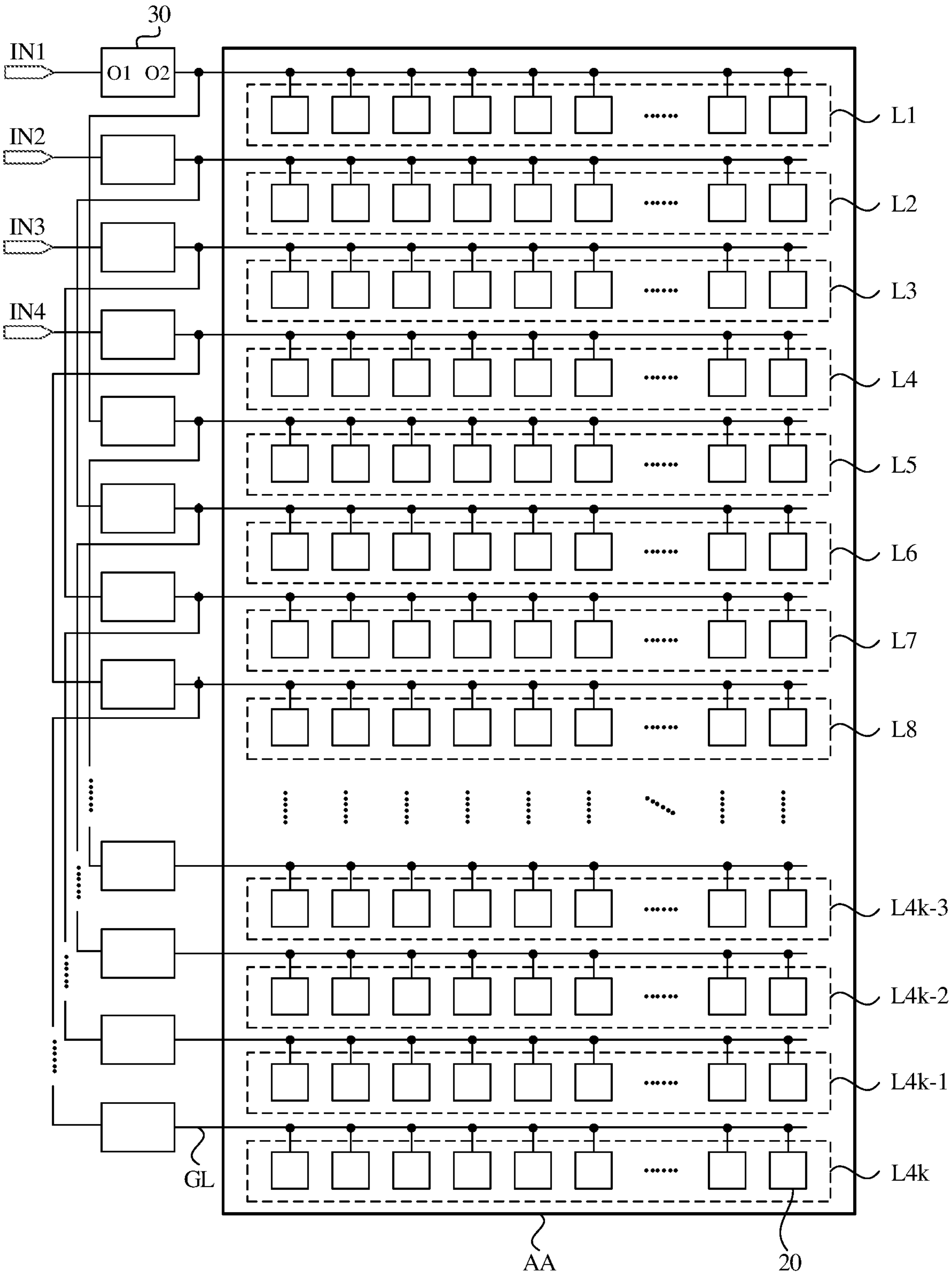
FIG. 8 is a structural diagram of another display panel according to an embodiment of the present application.

FIG. 8 is a structural diagram of another display panel according to an embodiment of the present application. FIG. 8 schematically shows the case where n=4 and the display panel includes 4k rows of the sub-pixel units 20. Referring to FIG. 8, in the case where n=4, the scan drive module includes four scan circuit groups. The first scan circuit group includes the scan circuits 30 connected to the first row of the sub-pixel units L1, the fifth row of the sub-pixel units L5, . . . , and the (4k−3)-th row of the sub-pixel units L4k−3 in one-to-one correspondence, and the scan circuits corresponding to the sub-pixel units in the first row, the fifth row, . . . , and the (4k−3)-th row are connected in a cascade manner in sequence. The second scan circuit group includes the scan circuits 30 connected to the second row of the sub-pixel units L2, the sixth row of the sub-pixel units L6, . . . , and the (4k−2)-th row of the sub-pixel units L4k−2 in one-to-one correspondence, and the scan circuits 30 corresponding to the sub-pixel units in the second row, the sixth row, . . . , and the (4k−2)-th row are connected in a cascade manner in sequence. The third scan circuit group includes the scan circuits 30 connected to the third row of the sub-pixel units L3, the seventh row of the sub-pixel units L7, . . . , and the (4k−1)-th row of the sub-pixel units L4k−1 in one-to-one correspondence, and the scan circuits 30 corresponding to the sub-pixel units in the third row, the seventh row, . . . , and the (4k−1)-th row are connected in a cascade manner in sequence. The fourth scan circuit group includes the scan circuits 30 connected to the fourth row of the sub-pixel units L4, the eighth row of the sub-pixel units L8, . . . , and the 4k–th row of the sub-pixel units L4k in one-to-one correspondence, and the scan circuits 30 corresponding to the sub-pixel units in the fourth row, the eighth row, . . . , and the 4k–th row are connected in a cascade manner in sequence.

Optionally, the first-stage scan circuit 30 in the first can circuit group is connected to a first start signal IN1, the first-stage scan circuit 30 in the second scan circuit group is connected to a second start signal IN2, the first-stage scan circuit 30 in the third scan circuit group is connected to a third start signal IN3, the first-stage scan circuit 30 in the fourth scan circuit group is connected to a fourth start signal IN4, the timing of the second start signal IN2 is later than the timing of the scan signal outputted by the last-stage scan circuit 30 in the first scan circuit group, the timing of the third start signal IN3 is later than the timing of the scan signal outputted by the last-stage scan circuit 30 in the second scan circuit group, and the timing of the fourth start signal IN4 is later than the timing of the scan signal outputted by the last-stage scan circuit 30 in the third scan circuit group. In this manner, within one scan cycle, the scan drive sequence of L1, L5, L4k−3, L2, L6, L4k−2, L3, L7, . . . , L4k−1, L4, L8, . . . , and L4k can be achieved, and each scan circuit in the first scan circuit group to the fourth scan circuit group sequentially outputs the scan signal to each row of the sub-pixel units, so as to drive the light-emitting devices in each row of the sub-pixel units 20 for light-emitting display.

With continued reference to FIG. 8, optionally, the first-stage scan circuits 30 in the second scan circuit group to the n-th scan circuit group are located between the first-stage scan circuit 30 and the second-stage scan circuit 30 in the first scan circuit group. For example, in the case where n=4, since the first rows of the sub-pixel units in the second sub-pixel unit group to the fourth sub-pixel unit group are all located between the first row of the sub-pixel units and the second row of the sub-pixel units in the first sub-pixel unit group, the first-stage scan circuits 30 in the second scan circuit group to the fourth scan circuit group are located between the first-stage scan circuit and the second-stage scan circuit 30 in the first scan circuit group; based on this, the second-stage scan circuits 30 in the second scan circuit group to the fourth scan circuit group are located between the second-stage scan circuit 30 and the third-stage scan circuit 30 in the first scan circuit group; and so on. The advantage of this arrangement is that the setting region of each scan circuit corresponds to the position of the corresponding row of the sub-pixel units 20 so that the scan circuit 30 is connected to the corresponding row of the sub-pixel units 20 and outputs the scan signal to the corresponding row of the sub-pixel units 20.

Based on the preceding embodiments of the present application, the inventor verified through comparative testing experiments that in the case where n=2, the odd-numbered rows of the sub-pixel units in the display panel are sequentially scanned and driven in the first period within one scan cycle, and the even-numbered rows of the sub-pixel units in the display panel are sequentially scanned and driven in the second period within one scan cycle, then the flicker degree of the display screen at the refresh rate of 15 Hz can be close to the flicker degree of the existing display panel at the refresh rate of 60 Hz, further verifying the improvement effect of the embodiments of the present application on the flicker phenomenon.

An embodiment of the present application further provides a display device, which may be a device with a display function such as a mobile phone, a computer, or a tablet computer. The display device provided in the embodiment of the present application includes the display panel provided in any embodiment of the present application. Therefore, the display device has the functional structure and beneficial effects of the display panel provided in any embodiment of the present application, which are not repeated.

Figure 9:
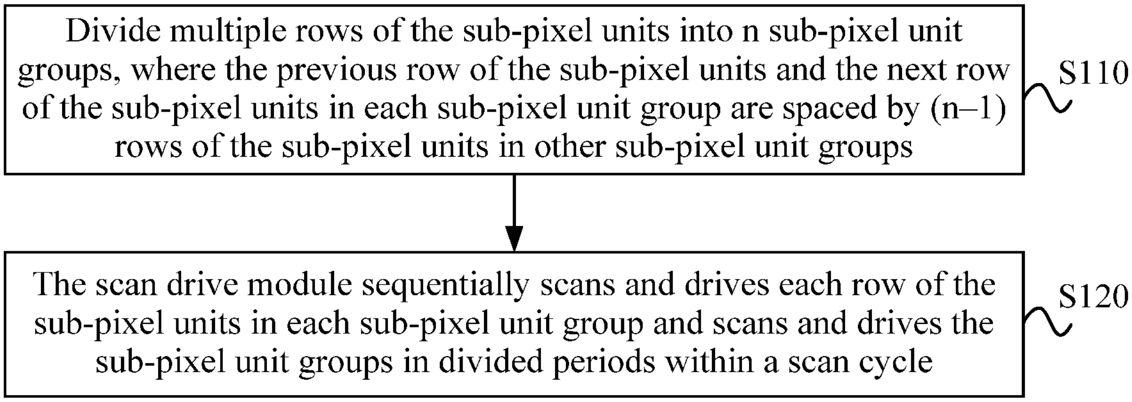
FIG. 9 is a flowchart of a driving method of a display panel according to an embodiment of the present application.

An embodiment of the present application further provides a driving method of a display panel, so as to drive the display panel provided in any embodiment of the present application. FIG. 9 is a flowchart of a driving method of a display panel according to an embodiment of the present application. Referring to FIG. 9, the driving method of a display panel specifically includes the steps below.

In S110, multiple rows of the sub-pixel units are divided into n sub-pixel unit groups, and the previous row of the sub-pixel units and the next row of the sub-pixel units in each sub-pixel unit group are spaced by (n−1) rows of the sub-pixel units in other sub-pixel unit groups.

In S120, the scan drive module sequentially scans and drives each row of the sub-pixel units in each sub-pixel unit group and scans and drives the sub-pixel unit groups in divided periods within a scan cycle.

In the embodiment of the present application, two adjacent rows of the sub-pixel units in each sub-pixel unit group are spaced by (n−1) rows of the sub-pixel units in other sub-pixel unit groups, the scan drive module sequentially scans and drives each row of the sub-pixel units in each sub-pixel unit group and scans and drives the sub-pixel unit groups in divided periods within a scan cycle. In this manner, multiple times of interlaced scan drive for each row of the sub-pixel units in one scan cycle are achieved, the scan drive time difference of adjacent rows of the sub-pixel units is extended, and the phase difference between the brightness change curves of adjacent rows of the sub-pixel units is increased so that the brightness at any position in the display region is a brightness coupling value of adjacent rows of the sub-pixel units, which is conducive to enabling an equivalent refresh rate of the coupled display screen to be higher than an actual refresh rate, thereby reducing the brightness change amplitude after coupling at each position in the display region and alleviating the flicker phenomenon. In addition, in this embodiment, the transistors or storage capacitors in the pixel circuit do not need to be changed to alleviate the flicker phenomenon, the process difficulty and production cost of the display panel are not increased, and this embodiment is easier to implement than the related art.

Based on the preceding embodiments, optionally, step S120 specifically includes sequentially scanning and driving, by the scan drive module, each row of the sub-pixel units in the first sub-pixel unit group in the first period within the scan cycle and sequentially scanning and driving each row of the sub-pixel units in the second sub-pixel unit group in the second period within one scan cycle, and so on, until rows of the sub-pixel units in the n-th sub-pixel unit group are sequentially scanned and driven in the n-th period at the last of the scan cycle. Based on the preceding embodiments, optionally, the driving method of a display panel further includes outputting, by each stage of scan circuit in the scan circuit group, scan signals to the corresponding row of the sub-pixel units stage by stage and sequentially outputting, by the first scan circuit group to the n-th scan circuit group, the scan signals to the first sub-pixel unit group to the n-th sub-pixel unit group.

What is claimed is:

1. A display panel, comprising:

a plurality of rows of sub-pixel units arranged in sequence, wherein the plurality of rows of sub-pixel units are divided into n sub-pixel unit groups, and two adjacent rows of the sub-pixel units in each sub-pixel unit group of the n sub-pixel unit groups are spaced by (n−1) rows of the sub-pixel units in other sub-pixel unit groups of the n sub-pixel unit groups, wherein n is a positive integer greater than or equal to 2; and a scan drive module, wherein the scan drive module is connected to each row of the sub-pixel units in each sub-pixel unit group in sequence and connected to each sub-pixel unit group in sequence; wherein the scan drive module is configured to sequentially scan and drive each row of the sub-pixel units in each sub-pixel unit group and scan and drive each sub-pixel unit group in divided periods within a scan cycle, the scan drive module comprises n scan circuit groups in one-to-one correspondence with the n sub-pixel unit groups, each scan circuit group comprises scan circuits, a scan circuit of the scan circuits comprises a start signal input terminal and a scan signal output terminal, a scan signal output terminal of a last-stage scan circuit of the scan circuits in a (j−1)-th scan circuit group is connected to a start signal input terminal of the first-stage scan circuit in a j-th scan circuit group, wherein j is a positive integer greater, and 2≤j≤n.

2. The display panel of claim 1, wherein a first row of the sub-pixel units in each sub-pixel unit group are sub-pixel units first to be scanned by the scan drive module in the each sub-pixel unit group within the scan cycle; and the scan drive module is configured to sequentially scan and drive a first sub-pixel unit group to an n-th sub-pixel unit group of the n sub-pixel unit groups within the scan cycle, wherein the first row of the sub-pixel units in the first sub-pixel unit group to the n-th sub-pixel unit group are adjacent in sequence.

3. The display panel of claim 2, wherein the scan drive module is configured to sequentially scan and drive each row of the sub-pixel units in the first sub-pixel unit group in a first period within the scan cycle and sequentially scan and drive each row of the sub-pixel units in a second sub-pixel unit group of the n sub-pixel unit groups in a second period within the scan cycle, until sequentially scan and drive each row of the sub-pixel units in the n-th sub-pixel unit group in an n-th period at the last of the scan cycle.

4. The display panel of claim 2, wherein n=2; the first row of the sub-pixel units in the first sub-pixel unit group are a first row of the plurality of rows of sub-pixel units in the display panel, the first row of the sub-pixel units in a second sub-pixel unit group of the n sub-pixel unit groups are a second row of the plurality of rows of sub-pixel units in the display panel, and a previous row of the sub-pixel units and a next row of the sub-pixel units in each sub-pixel unit group are spaced by one row of the sub-pixel units; and the scan drive module is configured to scan and drive each row of the plurality of rows of sub-pixel units within the scan cycle, and a scan drive sequence is: sequentially scanning and driving the first row of the sub-pixel units in the first sub-pixel unit group to a last row of the sub-pixel units in the first sub-pixel unit group in order of position and then sequentially scanning and driving the first row of the sub-pixel units in the second sub-pixel unit group to the last row of the sub-pixel units in the second sub-pixel unit group in order of position; or n=3;

the first row of the sub-pixel units in the first sub-pixel unit group are a first row of the plurality of rows of sub-pixel units in the display panel, the first row of the sub-pixel units in a second sub-pixel unit group of the n sub-pixel unit groups are a second row of the plurality of rows of sub-pixel units in the display panel, the first row of the sub-pixel units in a third sub-pixel unit group of the n sub-pixel unit groups are a third row of the plurality of rows of sub-pixel units in the display panel, and a previous row of the sub-pixel units and a next row of the sub-pixel units in each sub-pixel unit group are spaced by two rows of the sub-pixel units; and the scan drive module is configured to scan and drive each row of the plurality of rows of sub-pixel units within the scan cycle, and a scan drive sequence is: sequentially scanning and driving the first row of the sub-pixel units in the first sub-pixel unit group to a last row of the sub-pixel units in the first sub-pixel unit group in order of position, sequentially scanning and driving the first row of the sub-pixel units in the second sub-pixel unit group to the last row of the sub-pixel units in the second sub-pixel unit group in order of position, and then sequentially scanning and driving the first row of the sub-pixel units in the third sub-pixel unit group to the last row of the sub-pixel units in the third sub-pixel unit group in order of position; or n=4; the first row of the sub-pixel units in the first sub-pixel unit group are a first row of the plurality of rows of sub-pixel units in the display panel, the first row of the sub-pixel units in a second sub-pixel unit group of the n sub-pixel unit groups are a second row of the plurality of rows of sub-pixel units in the display panel, the first row of the sub-pixel units in a third sub-pixel unit group of the n sub-pixel unit groups are a third row of the plurality of rows of sub-pixel units in the display panel, the first row of the sub-pixel units in a fourth sub-pixel unit group of the n sub-pixel unit groups are a fourth row of the plurality of rows of sub-pixel units in the display panel, and a previous row of the sub-pixel units and a next row of the sub-pixel units in each sub-pixel unit group are spaced by three rows of the sub-pixel units; and the scan drive module is configured to scan and drive each row of the plurality of rows of sub-pixel units within the scan cycle, and a scan drive sequence is: sequentially scanning and driving the first row of the sub-pixel units in the first sub-pixel unit group to a last row of the sub-pixel units in the first sub-pixel unit group in order of position, sequentially scanning and driving the first row of the sub-pixel units in the second sub-pixel unit group to the last row of the sub-pixel units in the second sub-pixel unit group in order of position, sequentially scanning and driving the first row of the sub-pixel units in the third sub-pixel unit group to the last row of the sub-pixel units in the third sub-pixel unit group in order of position, and then sequentially scanning and driving the first row of the sub-pixel units in the fourth sub-pixel unit group to the last row of the sub-pixel units in the fourth sub-pixel unit group in order of position.

5. The display panel of claim 1, wherein each scan circuit group of the n scan circuit groups comprises scan circuits in one-to-one correspondence with each row of the sub-pixel units in a corresponding one of the n sub-pixel unit groups, output terminal, and the scan signal output terminal of the scan circuit is connected to one row of the sub-pixel units corresponding to the scan circuit.

6. The display panel of claim 5, wherein the scan circuit is configured to perform a timing shift on a start signal connected to the start signal input terminal of the scan circuit to obtain a scan signal and then output the scan signal to a corresponding row of the sub-pixel units through the scan signal output terminal and a scan line.

7. The display panel of claim 1, wherein the scan circuits in a scan circuit group of the n scan circuit groups are connected in a cascade manner in sequence, a start signal input terminal of a first-stage scan circuit of the scan circuits in the scan circuit group is connected to a start signal, a scan signal output terminal of an (i−1)-stage scan circuit of the scan circuits is connected to a start signal input terminal of an i-stage scan circuit of the scan circuits, and timing of the start signal connected to the first-stage scan circuit in the j-th scan circuit group of the n scan circuit groups is later than timing of the start signal connected to the first-stage scan circuit in the (j−1)-th scan circuit group of the n scan circuit groups, wherein 2≤i≤m, m denotes a total number of stages of the scan circuits in each scan circuit group.

8. The display panel of claim 7, wherein the first-stage scan circuit in a second scan circuit group to an n-th scan circuit group of the n scan circuit groups is located between the first-stage scan circuit and a second-stage scan circuit of the scan circuits in a first scan circuit group of the n scan circuit groups.

9. The display panel of claim 8, wherein the first-stage scan circuit in the first scan circuit group is connected to the start signal.

10. The display panel of claim 7, wherein the scan circuits in each scan circuit group are all located on a side of a non-display region of the display panel closing to a display region and are arranged in one column.

11. The display panel of claim 1, wherein each sub-pixel unit of the plurality of rows of sub-pixel units comprises a pixel circuit and a light-emitting device, wherein the pixel circuit is connected to a corresponding light-emitting device.

12. The display panel of claim 1, wherein n=2, n=3, or n=4.

13. A driving method of a display panel, wherein the display panel comprises:

a scan drive module; and a plurality of rows of sub-pixel units arranged in sequence, wherein the plurality of rows of sub-pixel units are divided into n sub-pixel unit groups, and two adjacent rows of the sub-pixel units in each sub-pixel unit group of the n sub-pixel unit groups are spaced by (n−1) rows of the sub-pixel units in other sub-pixel unit groups of the n sub-pixel unit groups, wherein n is a positive integer greater than or equal to 2; and the scan drive module is connected to each row of the sub-pixel units in each sub-pixel unit group in sequence and connected to each sub-pixel unit group in sequence; wherein the driving method of a display panel comprises:

sequentially scanning and driving, by the scan drive module, each row of the sub-pixel units in each sub-pixel unit group and scanning and driving the n sub-pixel unit groups in divided periods within the scan cycle, wherein the scan drive module comprises n scan circuit groups in one-to-one correspondence with the n sub-pixel unit groups, each scan circuit group comprises scan circuits, a scan circuit of the scan circuits comprises a start signal input terminal and a scan signal output terminal, a scan signal output terminal of a last-stage scan circuit of the scan circuits in a (j−1)-th scan circuit group is connected to a start signal input terminal of the first-stage scan circuit in a j-th scan circuit group, wherein j is a positive integer greater, and 2≤j≤n.

14. The driving method of a display panel of claim 13, wherein sequentially scanning and driving, by the scan drive module, each row of the sub-pixel units in each sub-pixel unit group and scanning and driving the n sub-pixel unit groups in divided periods within the scan cycle comprises:

sequentially scanning and driving, by the scan drive module, each row of the sub-pixel units in a first sub-pixel unit group of the n sub-pixel unit groups in a first period within the scan cycle and sequentially scanning and driving each row of the sub-pixel units in a second sub-pixel unit group of the n sub-pixel unit groups in a second period within the scan cycle, until sequentially scanning and driving each row of the sub-pixel units in an n-th sub-pixel unit group of the n sub-pixel unit groups in an n-th period at the last of the scan cycle.

15. The driving method of a display panel of claim 13, wherein each scan circuit group of the n scan circuit groups comprises scan circuits in one-to-one correspondence with each row of the sub-pixel units in a corresponding one of the n sub-pixel unit groups, and the scan signal output terminal of the scan circuit is connected to one row of the sub-pixel units corresponding to the scan circuit; wherein the driving method of a display panel comprises:

outputting, by each stage of scan circuit of the scan circuits in a scan circuit group of the n scan circuit groups, scan signals to a corresponding row of the sub-pixel units stage by stage and sequentially outputting, by a first scan circuit group to an n-th scan circuit group of the n scan circuit groups, scan signals to a first sub-pixel unit group to an n-th sub-pixel unit group of the n sub-pixel unit groups.

16. The driving method of a display panel of claim 15, wherein the scan circuits in the scan circuit group are connected in a cascade manner in sequence, a start signal input terminal of a first-stage scan circuit of the scan circuits in the scan circuit group is connected to a start signal, a scan signal output terminal of an (i−1)-stage scan circuit of the scan circuits is connected to a start signal input terminal of an i-stage scan circuit of the scan circuits, and timing of a start signal connected to the first-stage scan circuit in the j-th scan circuit group of the n scan circuit groups is later than timing of the start signal connected to a first-stage scan circuit in the (j−1)-th scan circuit group of the n scan circuit groups; wherein 2≤i≤m, m denotes a total number of stages of the scan circuits in each scan circuit group.

17. The driving method of a display panel of claim 15, wherein a first-stage scan circuit of the scan circuits in the first scan circuit group is connected to a start signal.

18. The driving method of a display panel of claim 13, wherein n=2, n=3, or n=4.

19. The driving method of a display panel of claim 13, wherein n=2; a first row of the sub-pixel units in a first sub-pixel unit group of the n sub-pixel unit groups are a first row of the plurality of rows of sub-pixel units in the display panel, the first row of the sub-pixel units in a second sub-pixel unit group of the n sub-pixel unit groups are a second row of the plurality of rows of sub-pixel units in the display panel, and a previous row of the sub-pixel units and a next row of the sub-pixel units in each sub-pixel unit group are spaced by one row of the sub-pixel units; and the scan drive module is configured to scan and drive each row of the plurality of rows of sub-pixel units within a scan cycle, and a scan drive sequence is: sequentially scanning and driving the first row of the sub-pixel units in the first sub-pixel unit group to a last row of the sub-pixel units in the first sub-pixel unit group in order of position and then sequentially scanning and driving the first row of the sub-pixel units in the second sub-pixel unit group to the last row of the sub-pixel units in the second sub-pixel unit group in order of position; or n=3; a first row of the sub-pixel units in a first sub-pixel unit group of the n sub-pixel unit groups are a first row of the plurality of rows of sub-pixel units in the display panel, the first row of the sub-pixel units in a second sub-pixel unit group of the n sub-pixel unit groups are a second row of the plurality of rows of sub-pixel units in the display panel, the first row of the sub-pixel units in a third sub-pixel unit group of the n sub-pixel unit groups are a third row of the plurality of rows of sub-pixel units in the display panel, and a previous row of the sub-pixel units and a next row of the sub-pixel units in each sub-pixel unit group are spaced by two rows of the sub-pixel units; and the scan drive module is configured to scan and drive each row of the plurality of rows of sub-pixel units within a scan cycle, and a scan drive sequence is: sequentially scanning and driving the first row of the sub-pixel units in the first sub-pixel unit group to a last row of the sub-pixel units in the first sub-pixel unit group in order of position, sequentially scanning and driving the first row of the sub-pixel units in the second sub-pixel unit group to the last row of the sub-pixel units in the second sub-pixel unit group in order of position, and then sequentially scanning and driving the first row of the sub-pixel units in the third sub-pixel unit group to the last row of the sub-pixel units in the third sub-pixel unit group in order of position; or n=4; a first row of the sub-pixel units in a first sub-pixel unit group of the n sub-pixel unit groups are a first row of the plurality of rows of sub-pixel units in the display panel, the first row of the sub-pixel units in a second sub-pixel unit group of the n sub-pixel unit groups are a second row of the plurality of rows of sub-pixel units in the display panel, the first row of the sub-pixel units in a third sub-pixel unit group of the n sub-pixel unit groups are a third row of the plurality of rows of sub-pixel units in the display panel, the first row of the sub-pixel units in a fourth sub-pixel unit group of the n sub-pixel unit groups are a fourth row of the plurality of rows of sub-pixel units in the display panel, and a previous row of the sub-pixel units and a next row of the sub-pixel units in each sub-pixel unit group are spaced by three rows of the sub-pixel units; and the scan drive module is configured to scan and drive each row of the plurality of rows of sub-pixel units within a scan cycle, and a scan drive sequence is: sequentially scanning and driving the first row of the sub-pixel units in the first sub-pixel unit group to a last row of the sub-pixel units in the first sub-pixel unit group in order of position, sequentially scanning and driving the first row of the sub-pixel units in the second sub-pixel unit group to the last row of the sub-pixel units in the second sub-pixel unit group in order of position, sequentially scanning and driving the first row of the sub-pixel units in the third sub-pixel unit group to the last row of the sub-pixel units in the third sub-pixel unit group in order of position; and then sequentially scanning and driving the first row of the sub-pixel units in the fourth sub-pixel unit group to the last row of the sub-pixel units in the fourth sub-pixel unit group in order of position.

20. A display panel comprising:

a plurality of rows of sub-pixel units arranged in sequence, wherein the plurality of rows of sub-pixel units are divided into n sub-pixel unit groups, and two adjacent rows of the sub-pixel units in each sub-pixel unit group of the n sub-pixel unit groups are spaced by (n−1) rows of the sub-pixel units in other sub-pixel unit groups of the n sub-pixel unit groups, wherein n is a positive integer greater than or equal to 2; and a scan drive module, wherein the scan drive module is connected to each row of the sub-pixel units in each sub-pixel unit group in sequence and connected to each sub-pixel unit group in sequence; wherein the scan drive module is configured to sequentially scan and drive each row of the sub-pixel units in each sub-pixel unit group and scan and drive each sub-pixel unit group in divided periods within a scan cycle; wherein a first row of the sub-pixel units in each sub-pixel unit group are sub-pixel units first to be scanned by the scan drive module in the each sub-pixel unit group within the scan cycle; and the scan drive module is configured to sequentially scan and drive a first sub-pixel unit group to an n-th sub-pixel unit group of the n sub-pixel unit groups within the scan cycle, wherein the first row of the sub-pixel units in the first sub-pixel unit group to the n-th sub-pixel unit group are adjacent in sequence; and the scan drive module is configured to sequentially scan and drive each row of the sub-pixel units in the first sub-pixel unit group in a first period within the scan cycle and sequentially scan and drive each row of the sub-pixel units in a second sub-pixel unit group of the n sub-pixel unit groups in a second period within the scan cycle, until sequentially scan and drive each row of the sub-pixel units in the n-th sub-pixel unit group in an n-th period at the last of the scan cycle.

* * * * *